Figure 1:
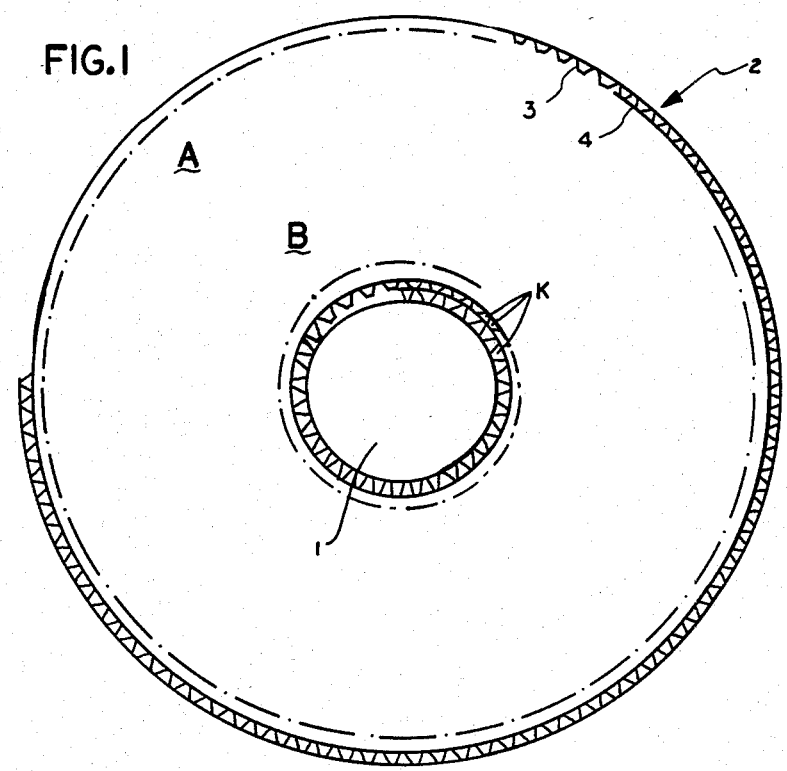

United States Patent [19]

Fuchs et al.

[11] Patent Number: 4,532,035
[45] Date of Patent: Jul. 30, 1985

[54] ROTATING BIOLOGICAL CONTACTOR FOR THE BIOLOGICAL PURIFICATION OF WASTE WATER

[75] Inventors: Ernst Fuchs, Schmerikon; Andreas Dudli, Uetliburg, both of Switzerland

[73] Assignee: Mecapec S.A., Schmerikon, Switzerland

[21] Appl. No.: 453,625

[22] Filed: Dec. 27, 1982

[30] Foreign Application Priority Data

Jan. 22, 1982 [DE] Fed. Rep. of Germany ....... 3201848

[51] Int. Cl.³ .............................................. C02F 1/74
[52] U.S. Cl. .................................. 210/150; 210/493.4; 210/497.1; 261/92
[58] Field of Search ..................... 210/150, 151, 493.4, 210/497.01, 497.1; 261/92

[56] References Cited

U.S. PATENT DOCUMENTS

| | | | |
|---|---|---|---|
| 3,323,963 | 6/1967 | Summers | 210/493.4 |
| 4,022,689 | 5/1977 | Kato et al. | 210/151 |
| 4,115,268 | 9/1978 | Thissen | 210/150 |
| 4,124,069 | 11/1978 | Becker | 165/170 |

FOREIGN PATENT DOCUMENTS

| | | | |
|---|---|---|---|
| 0014453 | 2/1979 | European Pat. Off. . | |
| 614681 | 12/1979 | Switzerland . | |
| 6452 | of 1909 | United Kingdom | 261/92 |
| 24382 | of 1913 | United Kingdom | 261/92 |

*Primary Examiner*—Richard V. Fisher
*Assistant Examiner*—W. Gary Jones
*Attorney, Agent, or Firm*—Yount & Tarolli

[57] ABSTRACT

With contactor bodies formed of spirally wound up corrugated panels providing ducts in the region of the corrugation profiles which are alternately filled with waste water and air, there is a problem to completely fill the ducts and to provide a continuous flow through the ducts in a body of simple and rigid construction.

In order to solve this problem, the corrugation profiles of at least one corrugated panel (3′, 3″) are inclined at a predetermined angle relative to the axis (XX) of the contactor body. Thereby, the disadvantages of the known, mechanically unstable constructions comprising a tube bundle are avoided and an intensive flow of waste water and air within the ducts is achieved. Advantageously, the corrugation profiles of winding layers arranged radially above each other or axially beneath each other comprise different inclination angles (a′, a″), especially angles which are opened contrary to each other.

6 Claims, 6 Drawing Figures

ROTATING BIOLOGICAL CONTACTOR FOR THE BIOLOGICAL PURIFICATION OF WASTE WATER

The invention relates to a rotating biological contactor according to the general kind described by the disclosure of Swiss Pat. No. 614,681 dated Dec. 14, 1979.

The known construction enables one to provide a contactor having a big effective surface, set into relation to the total volume of the contactor's body, and being of simple design. However, it would be desirable to improve the completeness of the filling and the uniformity of the flow of the waste water in the ducts of the contactor. It is therefore an object of the invention to provide a contactor with spirally wound corrugated panels forming the flow ducts which is simply and ruggedly constructed, and which is characterized by a complete filling and an uniform flow through the ducts. According to the invention, this is achieved by a contactor as defined in claim 1.

The design provided according to the invention, comprising profiled walls defining the ducts and being arranged in an angle relative to the axis of rotation assures a considerable reinforcement and stiffness of the construction, as the sidewalls of the ducts partially expire in circumferential direction around the body of the contactor. Simultaneously, a uniform filling of the ducts and a uniform flow through the ducts is attained, beginning at the end of the ducts which are immersed into the waste water at first. The air contained in the ducts before immersion is thereby continuously displaced by the entering waste water, the displacement being effected from the one end of the duct to the other one without the danger of any obstruction.

In this connection, attention is drawn to the prior act contactor disclosed in the European Patent Publication 0 014 453. That contactor comprises a plurality of tubes bundled together and expiring in an angle to the axis of rotation of the contactor body. However, the tube bundles are tied together without the provision of seperate connecting or stiffing elements and thereby are quite unstable. Further, that contactor provides tight and angled port sections between the outer surfaces of the round tubes. In these regions of the cross-section of the contactor's body there will be a rapid filling-up of the flow path, and therefore such a contactor is not suitable to solve the task of the present invention.

In a further developed embodiment of the contactor according to the present invention, the ducts defined by the walls of said corrugated panel may have different cross-section and/or different angles to the axis of rotation within the separate, layers of the contactor, laying radially one above the other one. Thereby, the distribution of the axial flow of the waste water relative to the cross-section of the contactor and the corresponding flow in the environment of the body of the contactor can be influenced and optimized in response to the particular conditions of operation.

A further embodiment of the contactor of the present invention exhibits similar advantages. This further embodiment comprises at least two corrugated panels arranged adjacent to each other in the direction of the axis of rotation of the contactor. However, the angle between the ducts formed by the corrugation of the panel and the axis of rotation of the contactor differs with each of said two panels. Thereby, it is possible to control the rate of the flow speed in the ducts along the axial extension of the contactor.

A counterflow in certain regions of the contactor, compared with the flow in other regions thereof, can be achieved, if the ducts formed by the corrugations of the panel in radially or axially adjacent regions of the contactor include contrary angles with the axis of rotation. The generation or increase of turbulence in the environment of the contactor is thereby assisted. In the case of counterflows in axially adjacent regions of the contactor body, preferably a flow directed from the longitudinal center of the contactor to both ends is tried to realize. This can be accomplished by means of inlet openings in the region between the sections of the contactor body passed by the flow in divergent directions. Thereby, a complementary, circluar flow of the waste water in the environment of the contactor is created.

Figure 2:
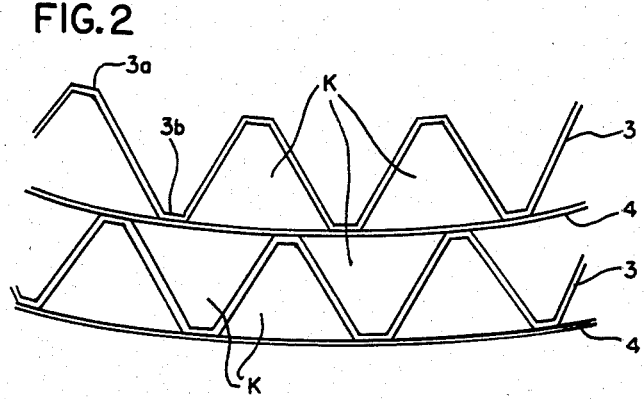
Figure 3:
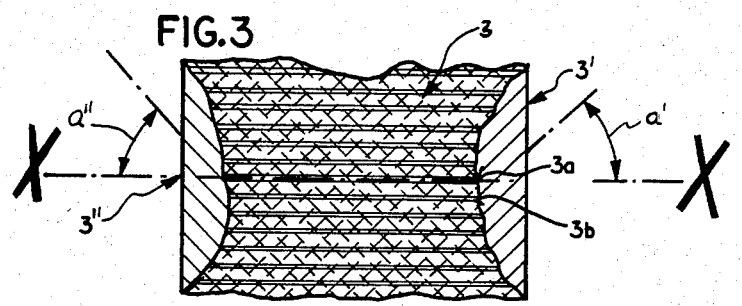
Figure 4:
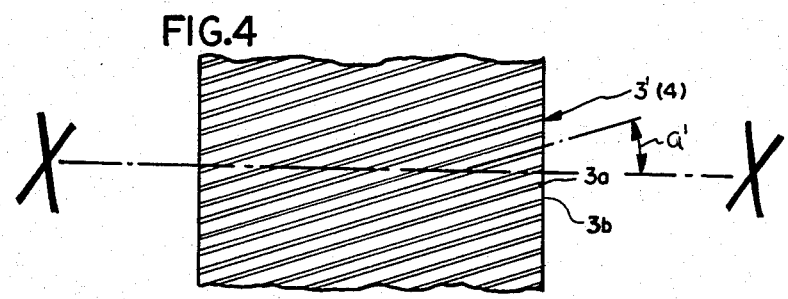
Figure 5:
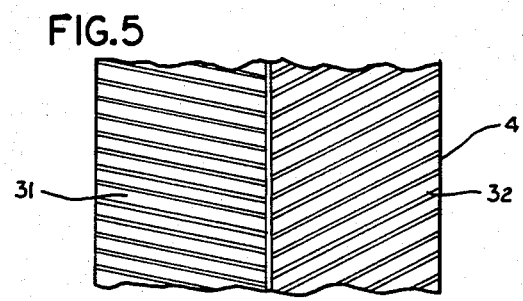
Figure 6:
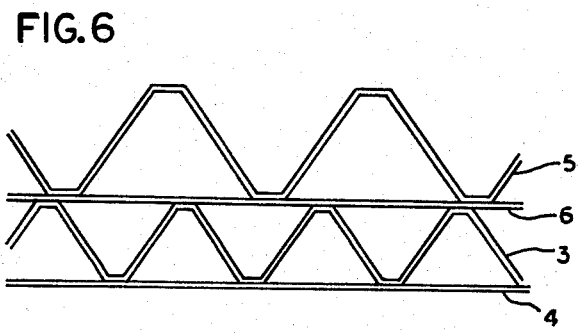

In the following, some embodiments of the invention are further explained, with reference to the accompanying drawings, wherein FIG. 1 shows a schematic side view of a contactor FIG. 2 shows a part of FIG. 1 in a greater scale, FIG. 3 shows an elevation of a panel of which the contactor is wound, FIG. 4 shows an other kind of panels, FIG. 5 shows still another kind of panels, and FIG. 6 shows a side view of four sandwiched panels to form a contactor by winding the panels up.

The biological contactor shown in FIG. 1 comprises a contactor body 2 with a central axis of rotation 1. The body 2 consists of two panels 3 and 4 made of synthetic resin or similar plastic material placed in contact one to each other and being spirally wound up around the central axis 1. For clarity's sake, only the innermost and outermost winding of the body 2 are shown in FIG. 1. The panel 3 is a corrugated panel (cf. FIG. 2), while the panel 4 is flat.

Between the flat panel 4 and the corrugations of the corrugated panel 3, there are formed a plurality of ducts k extending along the entire width of the body 2 of the contactor.

The outside of the apex regions 3a and/or of the bottom regions 3b of the corrugations of panel 3 are bonded or welded to adjacent regions of the flat panel 4 during winding up the two panels. If the apex regions as well as the bottom regions are bonded or welded, a stable, selfsupporting structure is realized, without the need of additional supporting or reinforcement members.

The cross section of the corrugations of panel 3 is shown in trapezoidal form. With respect to stability, this is the most advantageous cross section. However, it is understood that other cross sectional configurations are possible as well; the cross section of the corrugations could be arc shaped (sinusoidal), triangular, saw tooth shaped, rectangular etc. It is advantageous to choose the cross sectional size of the corrugations, i.e. of the ducts k, as small as possible to provide an inner surface area within the contactor as large as possible which is to be coated by the bacterial slime. On the other side a clearance of the ducts k substantially less than about 1 cm should be avoided because there could arise the danger that the clearance of the ducts k could be decreased to much by the bacterial slime growing on the inner walls, thereby disturbing the flow of water through the ducts too much.

In FIG. 3, there are shown parts of corrugated panels in an unwound state; in particular, there is shown a top view on a panel sandwich which can be spirally wound to get a contactor body. On the top, there is shown with solid lines a corrugated panel 3; the corrugations thereof extend parallel to the axis XX of the contactor body. On the bottom, below said first panel 3 and in wound state laying one radially above the other one relative to axis XX, there are provided further corrugated panels 3' and 3'' shown in broken lines, the corrugations thereof including angles a' and a'' respectively with the axis XX. In the finished body 2 of the contactor, the corrugations extend spirally relative to the axis of rotation with substantially high pitch. The angles a' and a'' correspond thereby to the sectional angle of the corrugation respective their longitudinal tangents with the axis of the body 2. The finished corrugations extending partially in circumferential direction of the body, there is assured the reinforcement effect already mentioned earlier. The different sectional angles between the corrugations and the axis of rotation provide further the already mentioned flow effects in the ducts of the contactor and in it's environment. The ducts shown in the drawings, during their immersion into the waste water while the contactor is rotating, carry air deeply into the waste water, and during leaving the waste water, they carry the amount of water countained therein in a high position above the water level. Thereby, an intensive turbulence is created in the waste water.

If it is desired to keep this turbulence as well as the flow in the ducts less intensive, the corrugations and thereby the ducts can be arranged in a more or less reduced angle relative to the axis of rotation of the contactor. Thereby, also the intensity of the immersion of air into the waste water can be controled as desired. If the ducts are arranged, e.g. in V-shape, without an opening in the apex region, there may be achieved an especially deep immersion of the air into the waste water, if the open ends of the ducts firstly immerse into the water, the apex of the V-shape being directed to the top. In this case, the air contained in the duct essentially leaves the duct only after the duct has passed it's deepest position in the path of movement through the waste water.

A number of modifications of the contactor according to the invention are possible. FIG. 5 for instance shows two corrugated panels 31 and 32 which are arranged one beneath the other one on a flat panel 4. The corrugations of the panels 31 and 32 are inclined with different angles. If the panels 4, 31 and 32 are wound up to form a contactor body, the panels 31 and 32 are adjacent in the direction of the axis of the contactor body and their corrugations are inclined with different angles to the axis of the contactor body.

Further, it may be advantageous to provide a different arrangement and/or different size of the ducts in different regions within the contactor body. For instance, the ducts k in an outer region A (FIG. 1), which moves with faster speed during the rotation of the contactor, may be differently inclined and/or may comprise different clearance than the ducts k in an inner region B of the contactor body, which later is immersed in the waste water with slower speed. Such a contactor may be constructed by providing a flat panel 4 with two different corrugated panels, arranged one behind the other one in longitudinal direction respective in winding direction, these two corrugated panels comprising corrugations with different clearance and/or different inclination.

The contactor body shown in FIG. 1 is constructed by means of a corrugated panel 3 and a flat panel 4; consequently it has the form of a 2-pitch spiral. Of course, it is also possible to construct this body in the form of a 4-pitch or 6-pitch spiral. A 4-pitch spiral design is obtained if, according to FIG. 6, two flat panels 4 and 6 and two corrugated panels 3 and 5 are alternately placed on each other and wound up to form a contactor body. The panels 3 and 5 thereby may comprise different corrugations in view of size and/or inclination.

Usually, the panels to be wound up to form a contactor body have the same width along the entire length. A contactor body wound by means of such panels will have a cylindrical configuration. The width of the panels and, consequently, the width of the contactor body, measured in the direction of the axis of rotation, may be in the region of 50 to 70 cm. The width of the panels may also increase or decrease in longitudinal direction, whereby the frontal faces of the contactor body would have conical shape.

The contactor body as described hereinbefore can be manufactured with extremely low costs, as it may comprise only two inexpensive, simple parts, i.e. a corrugated panel and a flat panel. These two panels are placed one above the other one and are wound up to a contactor body, thereby being bonded or welded with each other. The contactor body may comprise any desired diameter, and it exhibits a maximal effective surface within the ducts, relative to a given total volume of the entire body. The ducts are filled with water during immersion and emptied during emersion, thereby creating an intensive turbulence and mixing in the waste water as well as an aeration thereof.

We claim:

1. Apparatus for biologically purifying waste water comprising one corrugated panel spirally wound up to form a multilayer convolute contactor body, the corrugations of said panel extending across the width of said multilayer convolute contactor body at an angle to the axis thereof and defining flow ducts for the waste water, said one corrugated panel having a plurality of portions along the length thereof, each portion forming a layer of said multilayer convolute contactor body, and the corrugations of each two adjacent portions extending at different angles to the axis of said multilayer convolute contactor body so that adjacent layers of said multilayer convolute contactor body have corrugations extending at different angles to the axis thereof, and the angle at which corrugations of each layer of said multilayer convolute contactor body extend to the axis thereof progressively changes from the outermost layer of said multilayer convolute contactor body to the innermost layer thereof.

2. An apparatus as set forth in claim 1 further comprising a flat faced panel spirally wound up together with said one corrugated panel.

3. An apparatus as set forth in claim 1 wherein the corrugations of at least one portion of said one corrugated panel extend parallel to the axis of said multilayer convolute contactor body so that at least one layer has corrugations extending parallel to the axis of said multilayer convolute contactor body.

4. An apparatus as set forth in claim 1 comprising another corrugated panel arranged in superimposed relationship with said one corrugated panel and spirally wound up together with said one corrugated panel, said another corrugated panel also comprising a plurality of layer forming portions along the length thereof, the number of layer forming portions in said one and another corrugated panel being equal, and the corrugations of corresponding abutting pairs of layer forming portions on said one and another corrugated panels extending at different angles to the axis of said multilayer convolute contactor body.

5. An apparatus as set forth in claim 4 wherein said one and another corrugated panels are separated by a flat faced panel.

6. An apparatus as set forth in claim 5 wherein said panels are bonded or welded to each other.

* * * * *